United States Patent [19]

Sakamoto et al.

[11] Patent Number: 4,996,559
[45] Date of Patent: Feb. 26, 1991

[54] OPTICAL SYSTEM SUPPORTING MECHANISM FOR AN IMAGE PROCESSING EQUIPMENT

[75] Inventors: Naoki Sakamoto, Japan; Itakiyo Masanori, both of Osaka, Japan

[73] Assignee: Mita Industrial Co., Ltd., Osaka, Japan

[21] Appl. No.: 426,739

[22] Filed: Oct. 24, 1989

[30] Foreign Application Priority Data

Oct. 28, 1988 [JP] Japan .............................. 63-141429[U]

[51] Int. Cl.$^5$ ............................................ G03G 15/28
[52] U.S. Cl. ....................................................... 355/56
[58] Field of Search ................................... 355/55–58, 355/235, 236

[56] References Cited

FOREIGN PATENT DOCUMENTS 61-158350 7/1986 Japan .

*Primary Examiner*—A. A. Mathews
*Assistant Examiner*—D. Rutledge
*Attorney, Agent, or Firm*—Koda and Androlia

[57] ABSTRACT

The present invention relates to an optical system supporting mechanism of an image processing equipment featuring that at least two first guide members which move along a guide shaft and second guide members which are respectively placed corresponding to the first guide members, putting the guide shaft therebetween, are provided at a moving unit which supports an optical system that can travel along the guide shaft, arms rotatable centering around the shaft placed with the right angle to the axis of the guide shaft are provided at the moving unit, corresponding to the second guide members, the second guide members are attached to the end portions of the arms, and the arms are so energy-charged that the second guide members can be pushed against the guide shaft, thereby causing the tightening and fixing condition of the guide shaft between the first and the second guide members to be adjusted by the simple operation.

1 Claim, 5 Drawing Sheets (PRIOR ART)

OPTICAL SYSTEM SUPPORTING MECHANISM FOR AN IMAGE PROCESSING EQUIPMENT

BACKGROUND OF THE INVENTION

1. Field of the Invention

The present invention relates to an optical system supporting mechanism for moving the optical system by which a document of a document reading device in an image processing equipment such as a copying machine or a printer is exposed to light and scanned.

2. Description of the Prior Art

The general construction and the principle of a document reading device are explained with reference to FIG. 6. According to FIG. 6, a document 53 placed on a document set plate 52 is exposed to the light source 51 and scanned thereby.

The light source 51 and the first mirror 54 are so composed that they can move as a body from the position shown with the solid lines to that shown with the dashed lines in FIG. 6.

The second mirror 55 and the third mirror 56 are also so composed that they can move as a body from the position shown with the solid lines to that shown with the dotted lines in FIG. 6.

When the light source 51 and the first mirror 54 move in the direction of an arrow "A" from the position shown with the solid lines in FIG. 6, the second mirror 55 and the third mirror 56 also move at half the speed of the light source 51 and etc. in the same direction from the position shown with the solid lines in FIG. 6, while accompanying with the light source 51 and the first mirror 54.

Such an optical system as shown in the above is supported on the guide shaft 65 movably along therewith by means of the moving units 60a and 60b respectively shown in FIG. 7. Namely, the light source 51 and the first mirror 54 are mounted at one moving unit 60a, and furthermore the second mirror 55 and the third mirror 56 are mounted on the other moving unit 60b. Thus, the optical system travels along the guide shaft 65.

However, the moving unit 60a on which the light source 51, etc. are placed is so composed that the unit 60a can travel at a speed two times that of the moving unit 60b on which the second mirror 55, etc. are placed.

As the document reading device 59 is so composed as being shown in the above, the reflection light which is produced according to the result of shedding light on the document 52 by the light source 51 forms an image on the line sensor 58 consisting of CCD, etc. with the inclusion of the first mirror 54, the second mirror 55, the third mirror 56, and lens 57 which can collect this reflection light.

FIG. 7 shows the moving units 60a and 60b (hereinafter merely called the moving unit 60, including the moving units 60a and 60b) of the conventional optical system supporting mechanism which supports the optical system and moves along the guide shaft 65.

The conventional moving unit 60 is provided with at least two guide rollers 63, which are one of the examples of the first guide members and which move along the guide shaft 65.

Also, the pusher rollers 64 and 64 which are one of the examples of the second guide members are provided so that they can be placed in the opposite side of the guide rollers 63 and 63, putting the guide shaft 65 therebetween.

In addition, the moving unit 60 is provided with arms 67 rotatable around the arm supporting shafts 66 which are placed with the right angle to the guide shaft 65, corresponding to the pusher rollers 64, respectively. And the pusher rollers 64 are attached to the end portions of the arms 67.

Furthermore, these arms 67 are elastically energy-charged by means of springs 68 so that the pusher rollers 64 can be pushed against the guide shaft 65.

Therefore, as the guide shaft 65 is between the guide rollers 63 and the pusher rollers 64, the travelling unit 60 can be so supported by these rollers as the unit 60 can freely move along the guide shaft 65.

Also in the case that the guide rollers 63 and the pusher rollers 64 are worn and made small in diameter due to aging changes, etc., the pusher rollers 64 are pushed against the guide shaft 65 by means of the springs 68, and the guide shaft 65 is accordingly between the guide rollers 63 and the pusher rollers 64. Therefore, also in this case, the travelling unit 60 can be so supported by these rollers that the unit 60 can freely travel along the guide shaft 65.

It is necessry for the travelling unit 60 to be so composed that the travelling unit 60 can not be parted from the guide shaft 65, in order to prevent image reading from adverse influence which may be produced by large vibration which occurs due to reciprocating movements of the optical system having a considerable weight. For this reason, in order to control the direction of rotation of the arms 67 which moves around the arm supporting shafts 66, one-way clutches 69a and 69b which can permit normal rotation thereof but can not permit reverse rotation thereof are installed at the arm supporting shafts 66 and 66, thereby causing the pressure thereof against the guide shaft 65 to be enhanced. (However, the permitted direction or the prevented direction of the one-way clutch 69a and another one-way clutch 69b becomes reversed to each other).

Therefore, when the spring 68 is about to be elongated as a result of vibrations by the moving unit 60 due to starting and stopping of moving thereof, the arms 67 can move only in the contracting direction of the spring 68 by means of the one-way clutches 69a and 69b.

Therefore, the moving unit 60 can be supported without any rise due to the above vibrations.

Such an optical system supporting mechanism as shown in the above is disclosed by, for instance, the Japanese Laid-Open Pat. Pub. Sho-61-158350.

In the optical system supporting mechanism of the conventional image processing equipment, as one-way clutches are provided in order to prevent the above rising phenomena, the structure thereof may become complicated, thereby causing the cost of production to be increased.

Also, in the case that the moving unit is removed from the guide shaft as the one-way clutch inherently rotates in one direction, the moving unit must be removed together with the arms, etc., at the same time. Therefore, it may become difficult to carry out the maintenance through disassembling.

Furthermore, as usually an one-way clutch has some play, it is difficult for vibration to be sufficiently suppressed.

SUMMARY OF THE INVENTION

The invention has been invented to solve these and other problems in the prior arts.

It is therefore an object of the invention to provide an optical system supporting mechanism of an image processing equipment, by which the rise of the moving unit that can movably support the optical system can be prevented only with simple operation of the adjustment.

In order to accomplish the above purpose, the invention provides an optical system supporting mechanism for an image processing equipment, characterized by that at least two first guide members which move along a guide shaft and second guide members which are respectively placed corresponding to the first guide members, with the guide shaft therebetween, are provided at a moving unit which supports an optical system that can travel along the guide shaft, arms rotatable around the shaft placed with the right angle to the axis of the guide shaft are provided at the moving unit, corresponding to the second guide members, the second guide members are attached to the end portions of the arms, and the arms are so biased that the second guide members can be pushed against the guide shaft, a slot which is place at nearly a right angle to the axis of the guide shaft is formed at the arm, an engaging portion is formed at the edge at the guide shaft side of the arm, a mounting hole is formed at a plate spring in which the edge of the guide shaft side is brought into contact with the engaging portion of the arm, the plate spring is tightened to the moving unit through the arm by means of a screw which passes through the mounting hole of the plate spring and the slot of the arm, when the screw is loosened, the guide shaft is so composed that it can be put between the first guide members and the second guide members by means of the plate spring, and when the screw is tightened, the guide shaft is elastically tightened in a body integrally between the first and the second guide members which are integrally combined in a body by the screw through the moving unit.

According to the optical system supporting mechanism of the image processing equipment so composed as shown in the above, the arm and the plate spring are attached to the moving unit by means of the mounting hole formed in the plate spring and by means of the screw passing through the slot of the arm under such a condition that the edge of the guide shaft side of the plate spring may be brought into contact with the engaging portion provided at the edge of the guide shaft side of the arm on which the second guide members are mounted.

Therefore, when the screw is loosened, the second guide members are pushed against the guide shaft by means of the plate spring and the arm. As a result, the guide shaft is elastically put between the first guide members and the second guide members.

Under this condition, when the screw is tightened, the guide shaft can be integrally tightened as one body between the first and the second guide members, which are integral each other by the screw, through the travelling unit.

Therefore, only with simple operation of loosening or tightening the screw, the above tightening can be adjusted. In addition, in the case that some clearance occurs between the guide shaft and the first or the second guide members, resulting from that the guide rollers and the pusher rollers are worn and made small in diameter through aging changes, the above tightening condition can be easily adjusted only with similar simple operation in carrying out the periodic maintenance, etc.

This specifiction of the present invention specifically points out the subject thereof and is complete with the claims clearly claimed. The above, and other objects, features and advantages of the present invention, will become apparent from the following description taken in conjunction with the accompanying drawings.

DETAILED DESCRIPTION OF THE PREFERRED EMBODIMENTS

Figure 2:
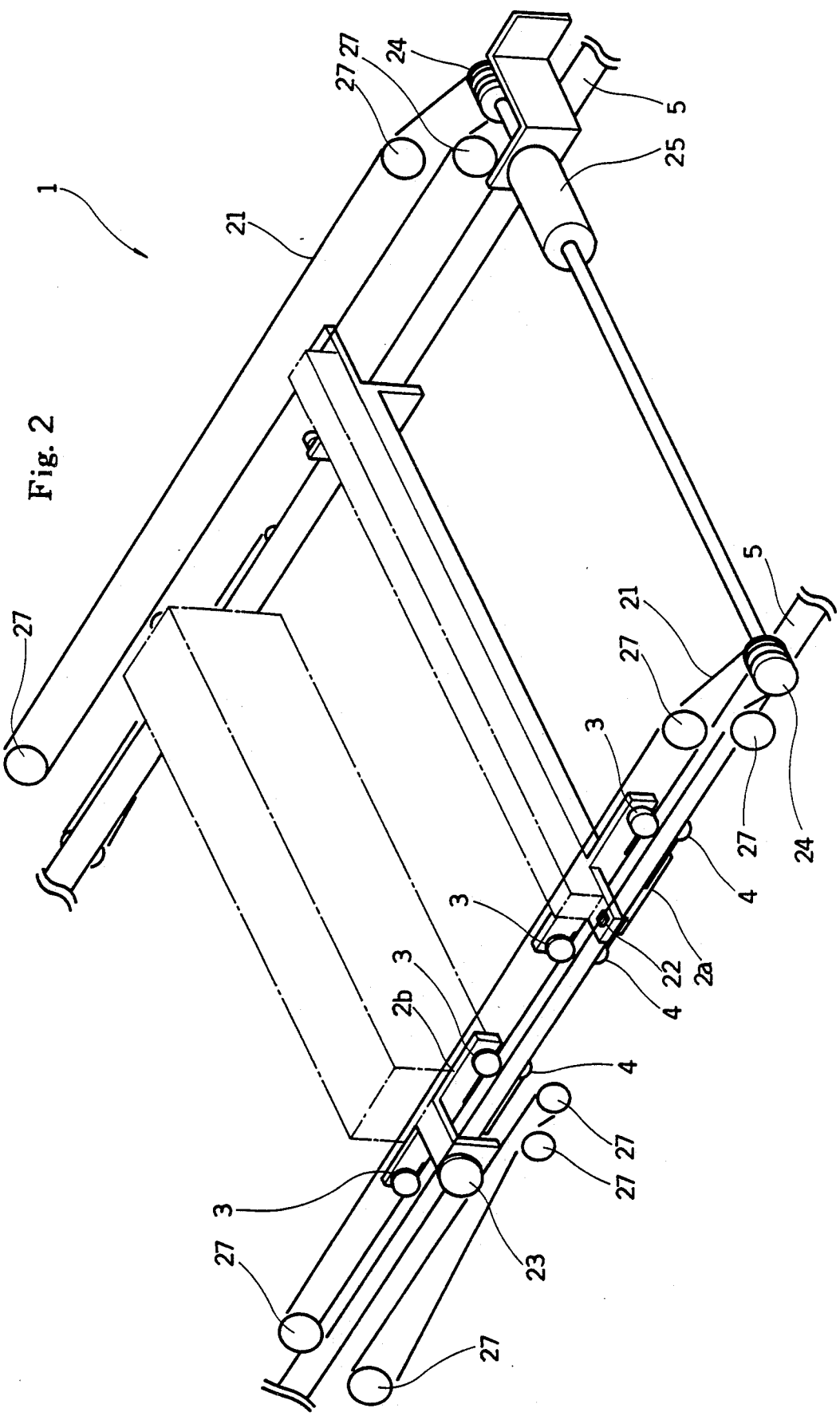
FIG. 2 is perspective view of the same mechanism as shown in the above, FIG. 3 (a) is a partial view of the main portion of the arm attached to the moving unit of the same mechanism as shown in the above, FIG. 3 (b) is a sectional view of the plate spring of the same arm.

As shown in FIG. 2, the optical system supporting mechanism 1 of a copying machine is provided with the moving units 2a and 2b which can travel along a guide shaft 5.

The moving unit 2a supports the optical system of the light source, etc. not illustrated therein, and the moving unit 2b supports another optical system of mirrors, etc. not illustrated therein.

The moving units 2a and 2b are attached to the guide shaft 5 by means of a pair of guide rollers 3 and 3 which are the first guide members and by means of a pair of pusher rollers 4 and 4 which are the second guide members.

The moving unit 2a is connected to a wire 21 by means of a connection piece 22.

Figure 5:
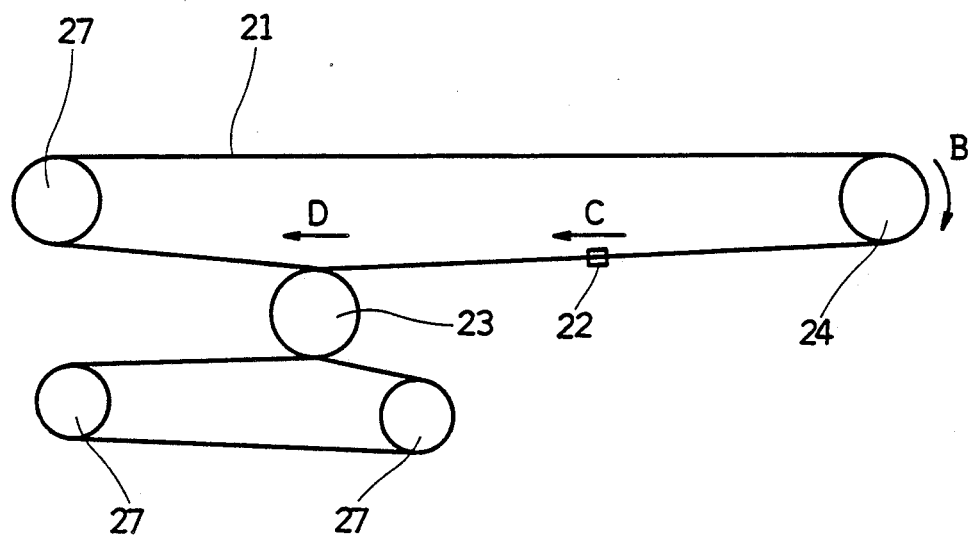
FIG. 5 is a view showing the simulated states of wire arrangement for explaining the drive of the travelling unit.
Figure 6:
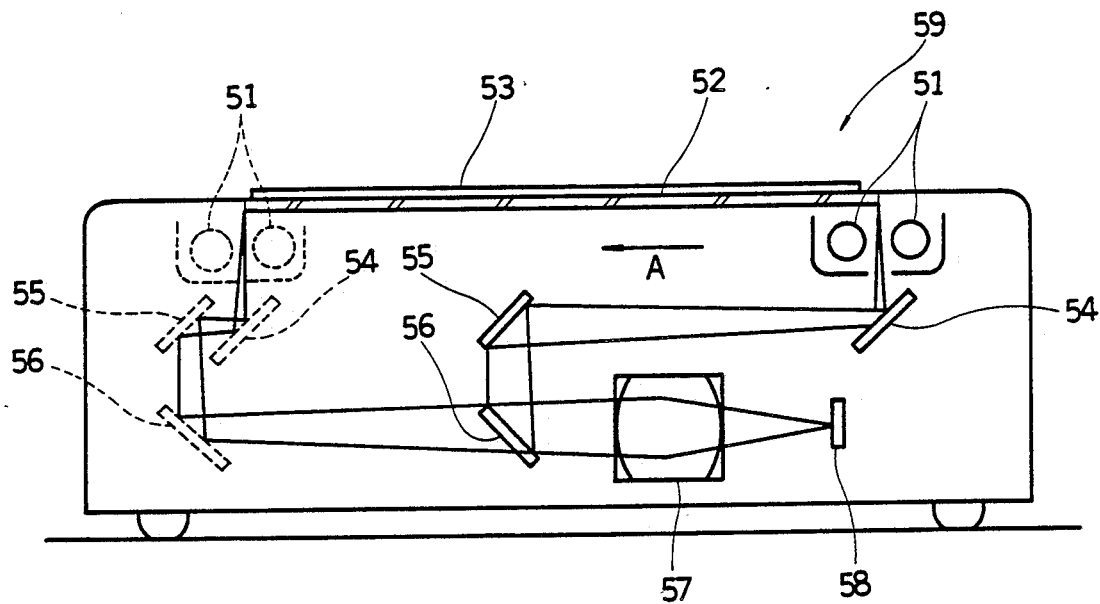
FIG. 6 is a view showing the simulated general composition of a document reading device of the copying machine.
Figure 7:
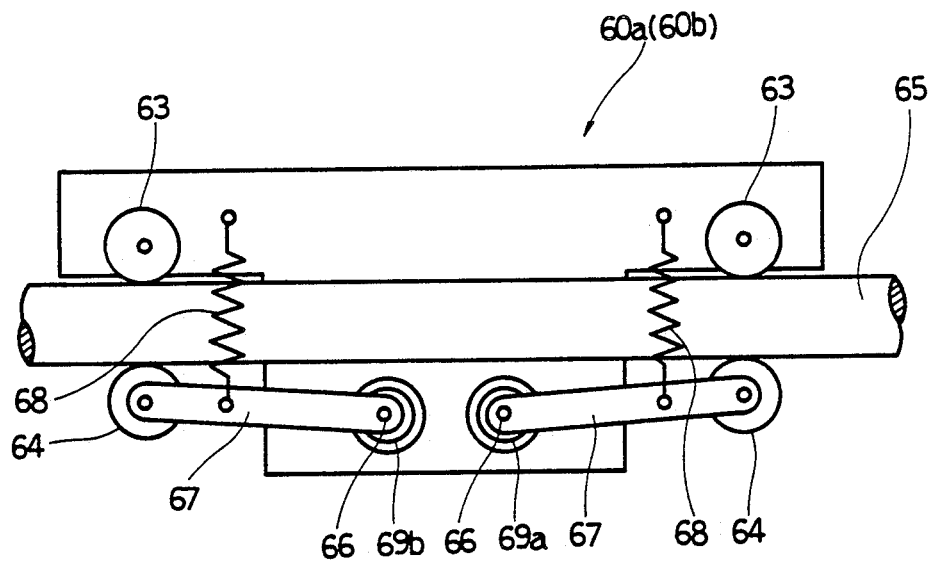
FIG. 7 is a view of the simulated travelling unit of the conventional optical system supporting mechanism.

The moving unit 2b is furnished with a travelling roller 23. Therefore, the units 2a and 2b move along the guide shaft 5 by drive of a drive motor 25 mounted at the drive roller 24 by means of the wire 21, wire holding rollers 27 provided at several points, and the moving rollers 23. FIG. 5 show the compositional relationship among the wire 21, the three wire holding rollers 27, the moving roller 23, the drive roller 24 and the connection piece 22.

According to FIG. 5, in the case that the drive roller 24 rotates in the direction of an arrow "B", the connection piece 22 moves in the direction of an arrow "C". At this time, as the wire 21 is set up and arranged as shown in FIG. 5, the roller 23 moves in the direction of an arrow "D" at half the speed of the connection piece 22.

Therefore, the moving unit 2b in FIG. 2 travels along the guide shaft 5 at a half speed of the travelling unit 2a.

Figure 1:
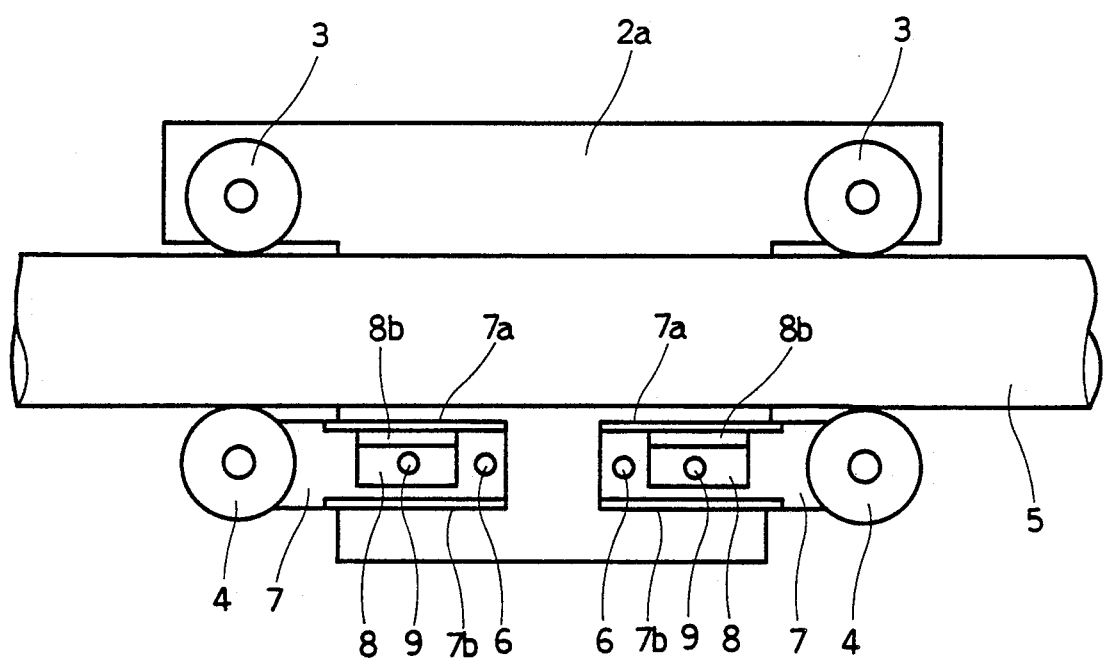
FIG. 1 is a side elevation view showing the outline of the moving unit of the optical system supporting mechanism of a copying machine according to one of the preferred embodiments of the invention.

FIG. 1 shows the moving unit 2a of the optical system supporting mechanism according to one of the embodiments of the invention, which supports the optical system and moves along the guide shaft 5. As the moving unit 2b is of the same construction as that of the moving unit 2a and the operation thereof is also the same as that of the moving unit 2a, the explanation is omitted.

As described in the above, guide rollers 3 which are at least two first guide members and move along the guide shaft 5 are attached to the moving unit 2a. In this embodiment, a pair of guide rollers 3 are used.

Also, a pair of pusher rollers 4 which are the second guide members are so provided that they can be placed in the opposite side of the guide rollers 3 and 3, putting the guide shaft 5 therebetween.

And two arms 7 rotatable around the arm supporting shafts 6 place at a right angle to the axis of the guide shaft 5 are installed at the moving unit 2a, corresponding to the pusher rollers 4 and 4, respectively. The pusher rollers 4 are rotatably mounted at the end portions of respective arms 7. A member 6a is a set ring for preventing the arms 7 and 7 from slipping off from the arm supporting shafts 6 (FIG. 3).

Figure 4:
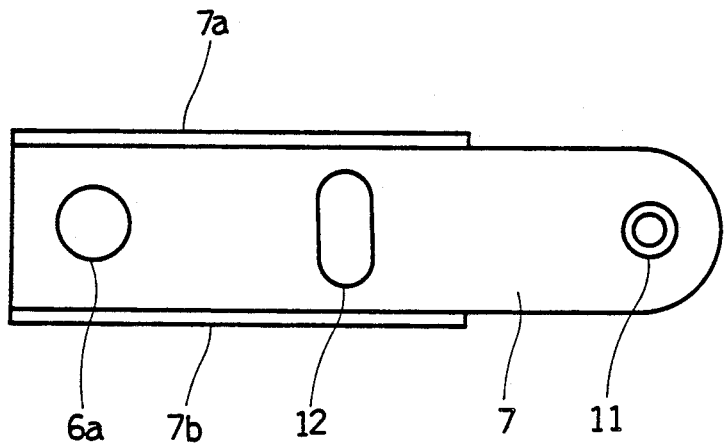
FIG. 4 is a view showing the parts of the arm portion.

FIG. 4 is a view showing the parts of the arm 7. A pusher roller mounting shaft 11 at which the pusher rollers 4 are mounted, the mounting hole 6a of the arm supporting shaft 6 and the slot 12 are formed in the arm 7.

This slot 12 is formed to be long almost in the direction of the right angle to the axis of the guide shaft 5 when the arms 7 are mounted at the moving unit 2a as shown in FIG. 1. And the arms 7 are provided with engaging portions 7a (7b and 7b) which are formed by folding the side edge of the arms 7 and 7 in a direction at right angles to the body of the arms 7 and 7.

Figure 3:
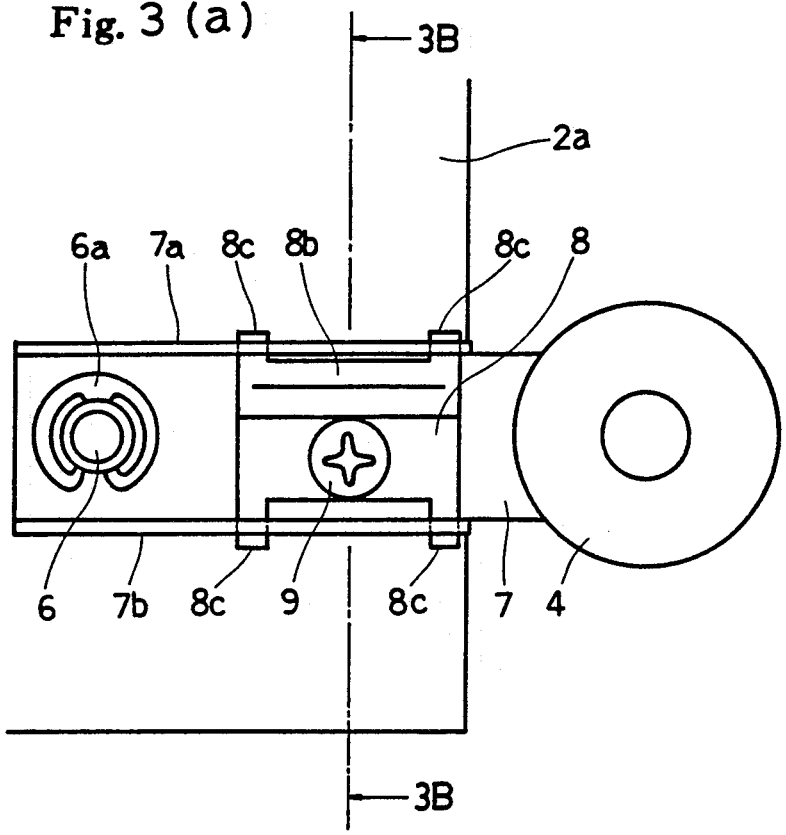
Figure 3:
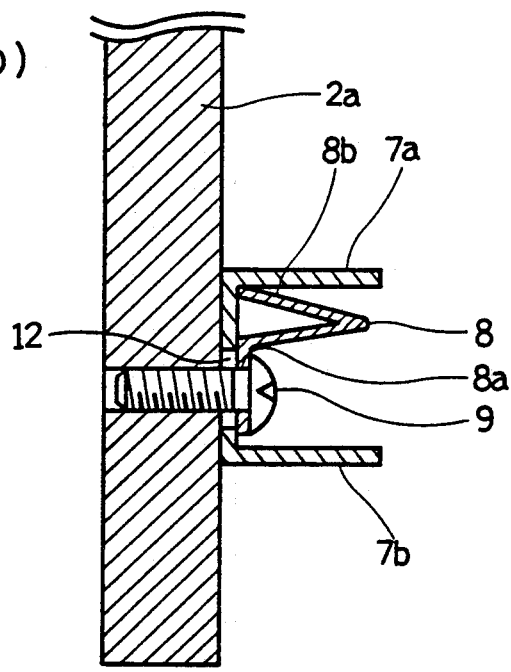

FIG. 3 (a) and (b) show the mounting state of the arm 7, the plate spring 8, the screw 9, etc. on the moving unit 2a. The counting hole 8a is formed in the vicinity of the central part of the plate spring 8. Also, this plate spring 8 is tightened and fixed to the moving unit 2a through the arm 7 by the screw 9 which passes through the slot 12 of the arm 7 and the mounting hole 8a of the plate spring 8 with the edge portion 8b at the side of the guide shaft 5 brought into contact with the engaging portion 7a of the guide shaft side of the arm 7.

Therefore, in the case that the screws 9 are tightened in FIG. 1, the edge portions 8b of the plate springs 8 elastically push the engaging portions 7a at the guide shaft side of the arms 7.

At this time, as the pusher rollers 4 which are the second guide members are pushed to the side of the guide shaft 5, the guide shaft 5 is elastically tightened between the guide rollers 3 and the pusher rollers 4.

Therefore, at this time, in the case that there is a clearance between the guide shaft 5 and these rollers, the angle of the arms 7 may change so that this clearance can be eliminated.

Also, in the case that the screws 9 are tightened under this condition, the guide shaft 5 can be tightened and fixed between the guide rollers 3 and the pusher rollers 4 which are combined in a body with inclusion of the travelling unit 2a.

Accordingly, even in the case that the moving unit 2a is subjected to vibrations due to starting and stopping of the travelling unit 2a, the moving unit 2a can be tightly held so that the moving unit 2a may not rise as the guide shaft 5 is put between the guide rollers 3 and the pusher rollers 4.

Besides, in the case that the guide rollers 3 and the pusher rollers 4 are worn and made small in diameter through aging changes, etc. after the above screws 9 are adjusted for loosening and tightening on shipment of the copying machine, a clearance may be produced between the guide shaft 5 and the guide rollers 3 or the pusher rollers 4, too. However, also in this case, as the angle of the arms 7 can be changed with only the simple operation of loosening or tightening in carrying out the periodic maintenance thereof, completely similar adjustment can be carried out, too.

In addition, the disassembling of the moving unit 2a can be easily conducted by virtue of simple construction thereof.

As for the engaging portion provided at the arm 7, only the engaging portion 7a at the side of the guide shaft 5 has been explained herein. However, as shown in FIGS. 1, 3 and 4, in the case that another engaging portion 7b is further provided and the right side arm 7 and the left side arm 7 shown in FIG. 1 are tried to be commonly used, the cost of production can be furthermore decreased.

FIG. 3 (a) shows the case that the plate spring 8 is provided with a hook 8c at all the four corners thereof for preventing the parts thereof from missing in maintenance. However, these and other partial modifications and/or addition may be optionally made instead.

In this embodiment, the first guide members and the second guide members are furnished with rollers. A member furnished with a groove formed along the guide shaft can be substituted. Both of these members can be selectively used.

As shown in the above, according to the invention, a guide shaft can be integrally tightened and fixed between the first and the second guide members installed at the moving unit of the optical system supporting mechanism, thereby causing vibration of the moving unit to be suppressed, and the moving unit can be so held that the moving unit may not rise.

In addition, it is possible to adjust the fixing condition therebetween only with simple operation of loosening and thightening of the screws. Therefore, the maintenance becomes easy. Furthermore, as the structure is simple, the maintenance work such as disassembling, etc. can be easily conducted, too.

It will be apparent that many other modifications and variations could be effected by one skilled in the art without departing from the spirit and scope of the novel concept of the invention. Therefore, though the above embodiments are a preferred example, the invention is not limited to the above embodiments.

It can be understood that any modifications and variations which can be produced within the inventive scopes shown in the claims described hereinafter and the scope meant by the claims hereof are all included in the claims attached hereto.

What is claimed is:

1. An optical system supporting mecahnism of an image processing equipment comprising:
at least two first guide members which move along a guide shaft and pusher rollers which are respectively placed corresponding to the first guide members, with the guide shaft therebetween, said at least two first guide members and said pusher rollers being provided on a moving unit which supports an optical system that can move along the guide shaft,
arms rotatable around a shaft provided at a right angle to an axis of the guide shaft, said arms being provided on the moving unit, corresponding to the pusher rollers,
the pusher rollers being attached to the end portions of the arms, and the arms being so biased that the pusher rollers are pushed against the guide shaft, and characterized by that:

a slot which is provided at nearly a right angle to the axis of the guide shaft is formed in the arm, an engaging portion is formed at the edge at the guide shaft side of the arm, a mounting hole is formed in a plate spring at an edge of the guide shaft side which is brought into contact with the engaging portion of the arm, the plate spring is elastically pushed toward the moving unit through the arm by means of a screw which passes through the mounting hole of the plate spring and the slot of the arm, when the screw is loosened, the guide shaft is so composed that it can be put between the first guide members and the pusher rollers by means of the plate spring, and when the screw is tightened, the guide shaft is integrally tightened in a body between the first guide members and the pusher rollers which are integrally combined as one body by the screw through the moving unit.

* * * * *